(12) United States Patent
Arudi et al.

(10) Patent No.: US 6,265,060 B1
(45) Date of Patent: Jul. 24, 2001

(54) MAGNETIC RECORDING MEDIUM INCORPORATING FLUORINE-CONTAINING, SOLVENT-SOLUBLE VINYL COPOLYMER HAVING NO VINYL CHLORIDE OR VINYLIDENE CHLORIDE COMPONENTS

(75) Inventors: Ravindra L. Arudi, Woodbury; Ramesh C. Kumar, Maplewood, both of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 08/404,234

(22) Filed: Mar. 15, 1995

(51) Int. Cl.$^7$ .................................................. G11B 5/702
(52) U.S. Cl. ............. 428/323; 428/694 B; 428/694 BG; 428/694 BC; 428/522; 428/900
(58) Field of Search ........................ 428/694 B, 694 BG, 428/694 BC, 522, 900, 323

(56) References Cited

U.S. PATENT DOCUMENTS

| | | | |
|---|---|---|---|
| 2,803,615 | 8/1957 | Ahlbrecht et al. | 260/29.6 |
| 3,149,996 | 9/1964 | Wagner et al. | 117/72 |
| 3,398,182 | 8/1968 | Guenthner et al. | 260/455 |
| 3,484,281 | 12/1969 | Guenthner et al. | 117/121 |
| 3,558,492 | * 1/1971 | Pnoskow | 252/62.54 |
| 3,976,626 | 8/1976 | Turck | 526/78 |
| 4,267,238 | 5/1981 | Chernega | 428/422 |
| 4,529,661 | 7/1985 | Ninomiya et al. | 428/425.9 |
| 4,671,996 | 6/1987 | Burguette et al. | 428/422 |
| 4,726,990 | * 2/1988 | Shimozawa et al. | 428/323 |
| 4,729,924 | 3/1988 | Skorjanec et al. | 428/422 |
| 4,758,471 | 7/1988 | Arioka et al. | 428/336 |
| 4,783,370 | * 11/1988 | Chernega et al. | 428/425.9 |
| 4,784,913 | 11/1988 | Nakamura et al. | 428/411.1 |
| 4,784,914 | 11/1988 | Matsufuji et al. | 428/418 |
| 4,794,035 | 12/1988 | Ishihara et al. | 428/219 |
| 4,803,125 | 2/1989 | Takeuchi et al. | 428/411.1 |
| 4,837,082 | 6/1989 | Harrell et al. | 428/329 |
| 4,861,683 | 8/1989 | Nakachi et al. | 428/694 |
| 4,876,149 | 10/1989 | Ramharack | 428/425.9 |
| 5,008,357 | 4/1991 | Nakachi et al. | 526/292.2 |
| 5,028,676 | 7/1991 | Nakachi et al. | 526/277 |
| 5,063,119 | * 11/1991 | Ishida et al. | 428/694 |
| 5,064,730 | 11/1991 | Takano et al. | 428/694 |
| 5,069,973 | 12/1991 | Saito et al. | 428/421 |
| 5,079,085 | 1/1992 | Hashimoto et al. | 428/327 |
| 5,081,213 | 1/1992 | Carlson | 528/73 |
| 5,098,783 | 3/1992 | Watanabe et al. | 428/323 |
| 5,139,892 | 8/1992 | Nakachi et al. | 428/694 |
| 5,320,914 | * 6/1994 | Nakamura et al. | 428/694 B |
| 5,380,905 | 1/1995 | Haidos et al. | 558/172 |

FOREIGN PATENT DOCUMENTS

| | | |
|---|---|---|
| 0 426 440 | 5/1991 | (EP) . |
| 54-46518 | 4/1979 | (JP) . |
| 54-46519 | 4/1979 | (JP) . |
| 54-84708 | 7/1979 | (JP) . |
| 61-275365 | 12/1986 | (JP) . |
| 62-30162 | 2/1987 | (JP) . |
| 62-48772 | 3/1987 | (JP) . |

OTHER PUBLICATIONS

Brochure, Sekisui Chemical Co., Ltd., Chem. Spec., Polyvinyl Acetal Resins, etc. (Jul. 1992).

* cited by examiner

Primary Examiner—Stevan A. Resan
(74) Attorney, Agent, or Firm—Amelia A. Buharin

(57) ABSTRACT

A magnetic recording medium, comprising a magnetic layer provided on a nonmagnetizable substrate, wherein the magnetic layer comprises a magnetic pigment dispersed in a polymeric binder, the polymeric binder comprising a resin, wherein the resin comprises a nonchlorinated fluorine-containing vinyl copolymer having pendant nitrile groups, pendant hydroxyl groups, and pendant fluorine-containing groups.

27 Claims, No Drawings

MAGNETIC RECORDING MEDIUM INCORPORATING FLUORINE-CONTAINING, SOLVENT-SOLUBLE VINYL COPOLYMER HAVING NO VINYL CHLORIDE OR VINYLIDENE CHLORIDE COMPONENTS

FIELD OF THE INVENTION

The present invention relates to magnetic recording media, and more particularly to magnetic recording media whose magnetic layers or backside layers, if any, contain a fluorine-containing, solvent-soluble vinyl copolymer having no vinyl chloride or vinylidene chloride substituents. The present invention also relates to such a fluorine-containing vinyl copolymer itself

BACKGROUND OF THE INVENTION

Magnetic recording media generally comprise a magnetic layer coated onto at least one side of a nonmagnetizable substrate. For particulate magnetic recording media, the magnetic layer comprises a magnetic pigment dispersed in a polymeric binder. The magnetic layer may also include other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

Some forms of magnetic recording media, such as magnetic recording tape, may also have a backside coating applied to the other side of the nonmagnetizable substrate in order to improve the durability, conductivity, and tracking characteristics of the media. The backside coating also includes a polymeric binder and other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

The polymeric binders of the magnetic layer and the backside coating are commonly derived from polymers which require curing in order to provide magnetic recording media with appropriate physical and electromagnetic properties. To prepare such media, the components of the magnetic layer or the backside coating, as appropriate, are combined with a suitable solvent and thoroughly mixed to form a homogeneous dispersion. The resulting dispersion is then coated onto the nonmagnetizable substrate, after which the coating is dried, calendered if desired, and then cured.

The polymeric binders of magnetic recording media are most commonly prepared from polymer blends comprising a hard resin component, i.e., a polymer with relatively high glass transition temperature ($T_g$) and modulus, and a soft resin component, i.e. a polymer with relatively low glass transition temperature and modulus. In the past, polyurethane polymers have been widely used as the soft resin component.

Copolymers based on vinyl chloride or vinylidene chloride have been widely used as the hard component of choice for use with polyurethanes, due to their miscibility and functional compatibility with polyurethanes and their relatively high glass transition temperatures, moduli, and hardnesses. Vinyl chloride or vinylidene chloride copolymers, however, tend to degrade over time, releasing gaseous HCl which can change the properties of the media as well as corrode the recording head or the like.

Accordingly, some investigators have described vinyl copolymers used in magnetic recording media, wherein the use of vinyl chloride and vinylidene chloride has been avoided. See, e.g., U.S. Pat. Nos. 5,098,783; 4,876,149; and 4,837,082; and Japanese Publication Nos. SHO 62-30162; SHO 54-84708; SHO 54-46519; and SHO 54-46518.

It is extremely desirable to lubricate the magnetic layer in order to minimize friction between the magnetic layer and the recording/playback head used to transfer signals to and from the magnetic layer. According to one approach for lubricating the magnetic layer, low molecular weight lubricant additives are blended into the dispersion used to form the magnetic layer. However, lubricants internal to the dispersion are not always desirable. Such lubricants may tend to plasticize the polymeric binder and thereby decrease the modulus of the magnetic layer. Further, excess lubricant can exude from the magnetic layer over time, leading to changes in the properties of the magnetic layer as well as to contamination of the head.

In another approach, topical lubricants having a low surface energy such as fluorinated monomers and oligomers may be applied to the surface of a magnetic recording medium such as a rigid disk. Topical lubricants are not generally used for flexible magnetic recording media such as high density diskettes because of the difficulty of providing a thin, uniform lubricant coating on the surface of such media. Incorporation of such fluorinated materials into the dispersion for the magnetic layer of a flexible medium is likewise unsuitable because of the poor solubility of the fluorinated material in common magnetic coating solvents such as methyl ethyl ketone (MEK).

What is needed in the art is a hard resin component of a polymeric binder which has no vinyl chloride or vinylidene chloride components, is soluble in common magnetic coating solvents, and is compatible with other magnetic layer and backside coating components. What is also needed in the art is a way to lubricate magnetic layers without relying solely upon low molecular weight lubricant additives.

SUMMARY OF THE INVENTION

We have now developed a magnetic recording medium whose polymeric binder system comprises a self-lubricating resin which has no vinyl chloride or vinylidene chloride components and which is soluble in methyl ethyl ketone (MEK) and other common solvents. This resin preferably is a hard resin component of the polymeric binder system. "Self-lubricating" means that the hard resin component has lubricating groups pendant from the polymer backbone that enable the polymeric binder to help lubricate the magnetic layer. As a result of using a self-lubricating hard resin component, less low molecular weight lubricant additives, or even no low molecular weight lubricant additives, may be needed.

In one aspect, the present invention concerns a magnetic recording medium comprising a magnetic layer provided on a nonmagnetizable substrate. The magnetic layer comprises a magnetic pigment dispersed in a polymeric binder, the polymeric binder comprising a resin, the resin comprising a nonchlorinated, fluorine-containing vinyl copolymer having pendant nitrile groups, pendant hydroxyl groups, and pendant fluorine-containing groups. Preferably, the vinyl copolymer is a hard resin component of the polymeric binder, the hard resin component having a $T_g$ of greater than 50° C., and the polymeric binder further comprises a soft resin component having a $T_g$ of less than 50° C. The vinyl copolymer hard resin component is compatible with other magnetic media formulation components such as the soft resin component of the polymeric binder, pigments, wetting agents and stabilizers. In preferred embodiments of the present invention, one or more components of the polymeric binder may be cured using suitable crosslinking techniques as described below.

In another aspect, the present invention concerns the nonchlorinated, fluorine-containing vinyl copolymer itself As used throughout this specification, the term "nonchlorinated" means that the fluorine-containing vinyl copolymer contains no covalently bound chlorine atoms. Thus, the term "nonchlorinated" excludes vinyl monomers such as vinyl chloride or vinylidene chloride as monomeric components of the copolymer, but the term "nonchlorinated" does not exclude monomeric components such as (meth) acryloyloxyethyl trimethylammonium chloride in which chlorine is present as a chloride anion.

The term "vinyl" with respect to a polymeric material means that the material comprises repeating units derived from vinyl monomers. As used with respect to a vinyl monomer, the term "vinyl" means that the monomer contains a moiety having a free-radically polymerizable carbon-carbon double bond. Monomers having such moieties are capable of copolymerization with each other via the carbon-carbon double bonds.

The term "compatible" with respect to two materials means that the two materials are capable of forming a mixture in solvent with no apparent phase separation, and may be used together in a blend to provide magnetic layers with excellent mechanical and electromagnetic characteristics, even though the two materials may be immiscible.

The term "immiscible" with respect to two polymers means that a blend of just the two polymers shows two glass transition temperatures ("$T_g$'s") when the blend is substantially free of solvent, provided that the $T_g$'s of the individual polymers are separated by more than about 30° C. The term "miscible", on the other hand, means that a blend of the two polymers shows a single $T_g$ when substantially free of solvent. In the practice of the present invention, $T_g$ is determined using differential scanning calorimetry (DSC) techniques.

Throughout this specification, the prefix "(meth)acryl-" means "methacryl-" or "acryl-".

DESCRIPTION OF THE PREFERRED EMBODIMENTS

Magnetic recording media of the present invention comprise a magnetic layer provided on a nonmagnetizable substrate. The particular nonmagnetizable substrate of the present invention may be formed from any suitable substrate material known in the art. Examples of suitable substrate materials include, for example, polymers such as polyethylene terephthalate ("PET"), polyimide, and polyethylene naphthalate ("PEN"); metals such as aluminum, or copper; paper; or any other suitable material.

The components of the magnetic layer comprise a magnetic pigment dispersed in a polymeric binder. Typically, the magnetic layer may contain 100 parts by weight of the magnetic pigment and 5 to 40 parts by weight of the polymeric binder. The type of magnetic pigment used in the present invention may include any suitable magnetic pigment known in the art including $\gamma$-$Fe_2O_3$, cobalt-doped $\gamma$-$Fe_2O_3$, $Fe_3O_4$, $CrO_2$, barium ferrite, barium ferrite derivatives, metal particles, and the like.

The polymeric binder of the present invention comprises a resin, the resin comprising a nonchlorinated, fluorine-containing vinyl copolymer having pendant nitrile groups, pendant hydroxyl groups, and pendant fluorine-containing groups. Preferably, the vinyl copolymer is a hard resin component of the polymeric binder, the hard resin component having a $T_g$ of greater than 50° C., and the polymeric binder further comprises a soft resin component having a $T_g$ of less than 50° C. More preferably, the $T_g$ of the hard resin component is in the range from 60° C. to 90° C. and the $T_g$ of the soft resin component is 25° C. or less. Still more preferably, the $T_g$ of the soft resin component is in the range from −50° C. to 25° C. The weight ratio of the hard resin component to the soft resin component is generally in the range from 19:1 to 1:19, preferably 5:1 to 1:5, more preferably 2:1 to 1:2.

We believe that the pendant nitrile and pendant hydroxyl groups of the nonchlorinated, fluorine-containing vinyl copolymer may promote the compatibility of this vinyl copolymer with polyurethanes as the soft resin component in a polymeric binder system. In addition, the nitrile groups have been observed to provide toughness to a magnetic layer having such a vinyl copolymer in the binder system.

In order to provide a vinyl copolymer having pendant nitrile groups, one or more nitrile functional vinyl monomers may be incorporated into the vinyl copolymer. The nitrile functional vinyl monomer is preferably present in the range from about 10 to about 40 parts by weight of the total monomer used to produce the vinyl copolymer. Representative examples of such monomers include (meth)acrylonitrile, β-cyanoethyl-(meth)acrylate, 2-cyanoethoxyethyl (meth)acrylate, p-cyanostyrene, p-(cyanomethyl)styrene, and the like. Preferably, the nitrile functional vinyl monomer is (meth)acrylonitrile, and more preferably acrylonitrile. Generally, preferred vinyl copolymers of the present invention have a nitrile equivalent weight in the range from 180 to 750 g/equivalent (g/eq), more preferably 200 to 400 g/eq.

The pendant hydroxyl groups of the vinyl copolymer not only facilitate dispersion of the magnetic pigment in the polymeric binder, thereby improving durability of the resulting magnetic recording medium, but the pendant hydroxyl groups also promote solubility of the binder in solvents commonly used for the production of magnetic recording media and curing of the binder by suitable crosslinking techniques. The hydroxyl groups may be primary or secondary, although primary hydroxyl groups are preferred. Generally, preferred vinyl copolymers of the present invention have a hydroxyl equivalent weight in the range from about 300 to about 2500 g/eq, and preferably 500 to 1000 g/eq.

In order to provide a vinyl copolymer having a plurality of pendant hydroxyl groups, one or more hydroxyl functional vinyl monomers may be incorporated into the vinyl copolymer. The hydroxyl functional vinyl monomer is preferably present in the range from about 1 to about 25 parts by weight of the total monomer used to produce the vinyl copolymer. Representative examples of suitable hydroxyl functional vinyl monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; or the like. Preferably, the hydroxyl functional vinyl monomer is selected from the class of hydroxyalkyl (meth)acrylates. Most preferably, the hydroxyl functional vinyl monomer is selected from 2-hydroxyethyl methacrylate and 2-hydroxypropyl acrylate. The presence of the hydroxyl functional vinyl monomer tends to promote the solubility of other monomers present during copolymerization of the vinyl copolymer. In particular, when a vinyl copolymer is produced without a hydroxyl functional vinyl monomer and a vinyl monomer bearing a dispersing group as described below is present during copolymerization, the vinyl copolymer has been observed to be inhomogeneous and phase separable in common organic solvents. The vinyl monomer bearing a dispersing group, particularly methacryloyloxyethyl trimethyl ammonium chloride, is believed to be insoluble unless a sufficient amount of hydroxyl functional vinyl monomer is present. In addition, the presence of the hydroxyl functional vinyl monomer enables a larger amount of the nitrile functional vinyl monomer described above to be incorporated into the vinyl copolymer.

Alternatively, vinyl copolymers with pendant hydroxyl groups can be prepared by incorporating vinyl acetate into the vinyl copolymer and then partially or fully hydrolyzing the acetate moieties to produce hydroxyl groups.

The fluorine-containing groups provide the vinyl copolymer with self-lubricating properties. As a result, lesser amounts of low molecular weight lubricants may be required to be incorporated into the magnetic layer. The space previously occupied by the low molecular weight lubricants can then be more advantageously used by incorporating extra magnetic pigment into the magnetic layer. Thus, magnetic layers of the present invention may, if desired, contain a higher weight loading of magnetic pigment as compared to similar corresponding magnetic layers whose binder polymers have no self-lubricating capability. Generally, the vinyl copolymers of the present invention have an equivalent weight of fluorine-containing groups in the range from 100 to 10,000 g/eq, more preferably 500 to 5,000 g/eq.

In order to provide a vinyl copolymer having pendant fluorine-containing groups, one or more different kinds of vinyl monomers bearing a fluorine-containing group can be incorporated into the vinyl copolymer. The vinyl monomer bearing a fluorine-containing group is preferably present in the range from about 0.5 to about 50 parts by weight of the total monomer used to produce the vinyl copolymer. In the practice of the present invention, such monomers generally comprise at least one fluorine-containing moiety and at least one ethylenically unsaturated polymerizable group. Preferred examples of such materials may be represented by the formula

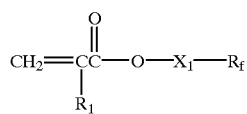
(1)

wherein $R_1$ is H or $CH_3$; $X_1$ is a single bond or a divalent organic linking group; and $R_f$ is a fluorinated moiety. More preferably, $R_f$ is a perfluorinated moiety.

One exemplary class of compounds according to Formula (1) includes (meth)acrylate acid esters of fluorine-containing alcohols. Such alcohols include (a) 1,1-dihydrofluoroalkanols such as

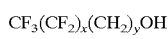
(2)

wherein x is an integer from 0 to 20, and y is an integer from 1 to 10; and

(3)

wherein x is an integer from 0 to 20, and y is an integer from 1 to 10;

(b) Fluoroalkylsulfonamido alcohols such as

(4)

wherein x is an integer from 0 to 20, $R^1$ is H or an alkyl, cycloalkyl, or arylalkyl of 1 to 20 carbon atoms, and $R^2$ is an alkylene group of 1 to 20 carbon atoms;

(c) Perfluorocyclodihydroalkyl alcohols such as

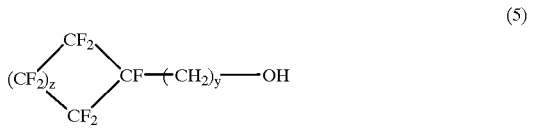
(5)

wherein z is an integer from 0 to 7, and y is an integer of 1 to 10;

(d) Fluoroether alcohols such as

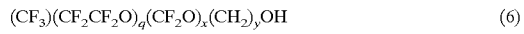
(6)

wherein q is 2 to 20 and greater than x, x is 0 to 20, y is 1 to 10, and the perfluoroalkoxy moieties —$CF_2CF_2O$— and —$CF_2O$— may be either arranged in blocks or randomly distributed along the backbone of the material; and

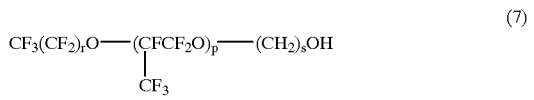
(7)

wherein p is 1 or more, preferably 1 to 6, s is 1 or more, preferably 1 to 3, and r is 1 to 6.

Specific examples of particularly preferred materials according to Formula (1) are the materials selected from the group consisting of

(8)

(9)

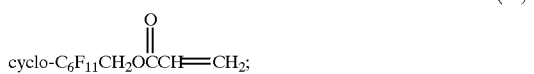
(10)

(11)

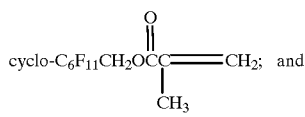

cyclo-C$_6$F$_{11}$CH$_2$OC(O)C(CH$_3$)=CH$_2$; and (11a)

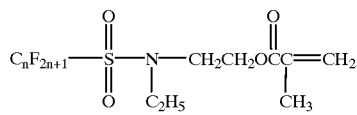

C$_n$F$_{2n+1}$—S(O)$_2$—N(C$_2$H$_5$)—CH$_2$CH$_2$OC(O)C(CH$_3$)=CH$_2$ wherein n has an average value from about 7 to about 8, more preferably 7.5.

Another exemplary class of compounds containing at least one fluorine-containing moiety and at least one ethylenically unsaturated moiety includes perfluoroalkyl group-containing urethane monomers represented by the following general formula:

(12)

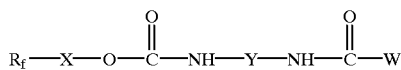

R$_f$—X—O—C(O)—NH—Y—NH—C(O)—W wherein:
  R$_f$ is a perfluoroalkyl group comprising from about 4 to about 20 carbon atoms;
  X is a divalent organic linking group and is preferably selected from the group consisting of —CH$_2$CH(A)C$_j$H$_{2j}$—, —C$_k$H$_{2k}$—, and —SO$_2$N(R$_1$)C$_m$H$_{2m-1}$; wherein A is selected from the group consisting of hydrogen, lower alkyl of 1 to 5 carbon atoms, hydroxyl, lower alkoxy of 2 to 6 carbon atoms, and carbonyloxy; j is 0 to 4; each of k and m is independently 1 to 4; R$_1$ is selected from the group consisting of hydrogen and a lower alkyl group of 1 to 4 carbon atoms;
  Y is a divalent organic linking group; and
  W is a monovalent organic group containing an ethylenically unsaturated group.

Examples of divalent organic groups represented by Y in the perfluoroalkyl group-containing urethane monomer of the Formula (12) are those selected from the group consisting of (13)

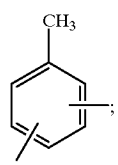

(14)

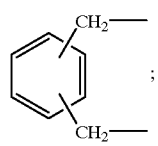

(15)

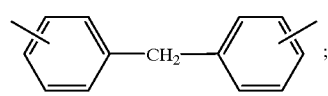

(16)

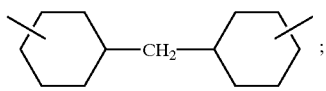

(17)

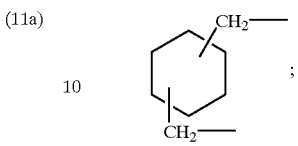

(18)

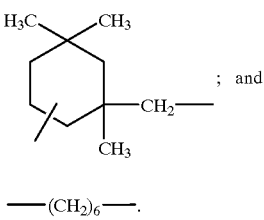
; and (19)

—(CH$_2$)$_6$—.

Examples of monovalent organic groups represented by W in the perfluoroalkyl group containing urethane monomer of the Formula (8) include but are not limited to those selected from the group consisting of (20)

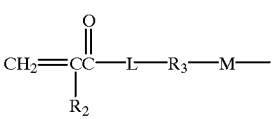

CH$_2$=C(R$_2$)C(O)—L—R$_3$—M— wherein R$_2$ is selected from the group consisting of H, methyl, ethyl, cyano, and carboxymethyl; L is selected from the group consisting of —O— and —NH—; R$_3$ is an alkylene group comprising 1 to 12 carbon atoms; and M is selected from the group consisting of —O—, —NH—, and

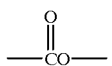

—C(O)O—

The perfluoroalkyl group-containing urethane monomer of the Formula (12) can be prepared by the processes described in U.S. Pat. Nos. 3,398,182 and 3,484,281. More specifically, one mole of fluorine-containing alcohol (R$_f$XOH) and one mole of diisocyanate compound (OCN—Y—NCO) are mixed and heated in the presence or absence of a catalyst such as triethylamine. After this first stage of the reaction, one mole of ethylenically unsaturated alcohol, amine, carboxylic acid, or the like is added to the reaction product, R$_f$XOC(O)NHYNCO of the first stage, thereby giving a fluorine-containing compound with ethylenic unsaturation wherein R$_f$, X, and Y are as defined for Formula (12).

Representative examples of useful ethylenically unsaturated alcohols, amines, carboxylic acids, or the like, for preparing perfluoroalkyl group-containing urethane monomer include the alcohols shown in Formulas (2) through (11 a) above.

In one preferred embodiment of the present invention, in addition to the nitrile groups, hydroxyl groups, and fluorine-containing groups, the vinyl copolymer of the present invention may further comprise one or more pendant dispersing groups and/or pendant radiation curable moieties. The dispersing group, if any, of the vinyl copolymer facilitates dispersion of the magnetic pigment in the polymeric binder. In those instances wherein the vinyl copolymer includes more than one dispersing group, the dispersing groups may be the same, or they may be different. It is desirable that the vinyl copolymer have a dispersing group equivalent weight in the range from about 2000 to about 100,000 g/eq, preferably about 5000 to about 50,000 g/eq.

As used throughout this specification, the term "dispersing group" means that a group is capable of wetting the magnetic pigment. Representative examples of suitable dispersing groups include quaternary ammonium moieties (e.g., —N(CH$_3$)$_3$$^+$Cl$^-$ as one example), amines (e.g., —N(CH$_3$)$_2$ as one example), heterocyclic moieties as described in U.S. Pat. No. 5,081,213, sulfobetaines (e.g., —N$^+$(CH$_3$)$_2$(CH$_2$CH$_2$CH$_2$SO$_3$$^-$)), salts or acids based on sulfate (e.g., —OSO$_3$Na as one example), salts or acids based on sulfonate (e.g., —SO$_3$Na as one example), salts or acids based on phosphate (e.g., —OPO(OH)$_2$ as one example), salts or acids based on phosphonate (e.g., —PO(OH)$_2$ as one example), salts or acids based on carboxyl (e.g., —COONa as one example), mixtures thereof, and the like.

One or more dispersing groups can be introduced into the vinyl copolymer in a variety of ways. As one approach, dispersing initiators may be used. Dispersing initiators initiate copolymerization of vinyl monomers to provide vinyl copolymers with terminal dispersing groups. Examples of suitable dispersing initiators include 4,4'-azobis(cyanovaleric acid), succinic acid peroxide, potassium persulfate, and sodium perphosphate. Another approach for introducing the dispersing group into the vinyl copolymer is to use a functional chain transfer agent such as mercaptosuccinic acid during copolymerization of the vinyl monomers.

The dispersing group may also be introduced into the vinyl copolymer through the use of a nonhalogenated vinyl monomer bearing a dispersing group during copolymerization. Use of such a method allows the vinyl copolymer having dispersing groups to be conveniently obtained in a single-step reaction. Representative examples of suitable nonhalogenated vinyl monomers bearing a dispersing group include (meth)acryloyloxyethyl trimethyl ammonium chloride, (meth)acryloyloxyethyl acid phosphate, diphenyl 2-(meth)acryloyloxyethyl phosphate, (meth)acrylamidopropyl trimethylammonium chloride, (meth)acryloyloxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N, N-dimethylammonium betaine, vinylbenzyl trimethylammonium chloride, mixtures thereof, and the like.

A dispersing group may also be introduced into the vinyl copolymer using suitable polymer reactions. Examples of suitable polymer reactions to provide the dispersing group include: (1) reaction of succinic anhydride with all or a portion of the hydroxyl groups on a vinyl copolymer to produce a vinyl copolymer with pendant acid functionality; (2) reaction of a difunctional material comprising an NCO moiety and a dispersing group with all or a portion of the hydroxyl groups on the vinyl copolymer to provide a polymer having corresponding pendant dispersing groups (See, e.g., Assignee's copending application, U.S. Ser. No. 08/329492, filed Oct. 26, 1994 under the title "Novel Self-Wetting Binders for Magnetic Media" in the name of Ravindra L. Arudi, which describes reacting a monomer comprising NCO and quaternary ammonium moieties with hydroxyl-functional polymers to provide such polymers with pendant quaternary ammonium functionality); and (3) reaction of a tertiary amine with the epoxy groups on a vinyl copolymer to produce a vinyl copolymer with pendant quaternary ammonium groups. In order to provide a vinyl copolymer having pendant epoxy groups for this last reaction, nonhalogenated epoxy-functional vinyl monomers may be incorporated into the vinyl copolymer. Such monomers include, for example, glycidyl ether of an unsaturated alcohol such as allyl glycidyl ether, a glycidyl ester such as glycidyl (meth)acrylate, and the like. The second polymer reaction described above is advantageous because dispersing groups may be attached to a hydroxyl-functional vinyl copolymer already having desirable properties for use as the hard resin component of a polymeric binder without significant alteration of those desirable properties.

Radiation curable groups suitable in the practice of the present invention generally include moieties comprising carbon-carbon double bonds such as (meth)acrylate groups, allyloxy moieties (—O—CH$_2$—CH=CH$_2$), and α-methyl styrene moieties of the formula (21)

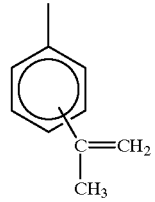

According to one technique for incorporating radiation curable (meth)acrylate moieties into the nonchlorinated fluorine-containing vinyl copolymer, all or a portion of the hydroxyl groups of the vinyl copolymer can be reacted with a difunctional material comprising an NCO moiety and a (meth)acrylate moiety. Suitable difunctional materials comprising NCO and (meth)acrylate functionality may be represented by the formula (22)

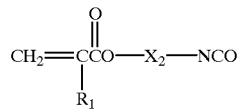

wherein R$_1$ is —H or —CH$_3$, and X$_2$ is an organic divalent linking group. Preferably X$_2$ is a divalent alkyl, cycloalkyl, aryl, or alkylaryl moiety of 1 to 20 carbon atoms. More preferably, X$_2$ is —CH$_2$CH$_2$—. The reaction between the hydroxyl groups of the vinyl copolymer and the material of Formula (22) may be represented schematically by the following:

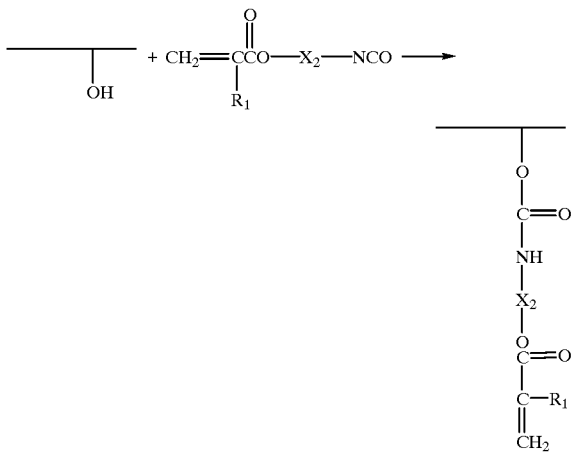

Traditionally, radiation curable formulations have most commonly relied upon the reactivity of acrylates, methacrylates, and the like to achieve radiation-induced crosslinking. Unfortunately, however, magnetic dispersions prepared from such materials tend to undergo unwanted crosslinking reactions under ambient conditions to form gels, particularly when the magnetic pigment is a metal particle pigment or a high surface area oxide. These dispersions are especially prone to suffer from undesirable crosslinking during dispersion milling. However, because radiation curable polymers having dispersing groups are capable of wetting/dispersing the magnetic pigment, it would be desirable to include at least some of such polymers in the milling step. In order to accomplish this, radiation curable (meth)acrylate groups may be replaced by allyloxy groups ($-O-CH_2-CH=CH_2$), or α-methyl styrene moieties. Allyloxy groups and a-methyl styrene moieties are more stable to the milling process than (meth)acrylate groups. Techniques for incorporating allyloxy and a-methyl styrene moieties into hydroxyl functional polymers have been described in Assignee's copending application, U.S. Ser. No. 08/054312, filed Apr. 27, 1993 under the title "Magnetic Recording Media Whose Magnetic Layer Incorporates Nonhalogenated Vinyl Copolymer" in the names of Kumar, et al, and also in Assignee's U.S. Pat. No. 5,380,905.

In one preferred embodiment of the present invention, the fluorine-containing vinyl copolymer of the present invention is a copolymer (hereinafter referred to as the Preferred Vinyl Copolymer) of monomers comprising 15 to 40 parts by weight (meth)acrylonitrile; 1 to 15 parts by weight of one or more nonhalogenated hydroxyl functional vinyl monomers as described above; 2.5 to 20 parts by weight of one or more vinyl monomers bearing a fluorine-containing group as described above; and 40 to 75 parts by weight of one or more nondispersing vinyl monomers. It is also preferred that radiation curable moieties be incorporated into the Preferred Vinyl Copolymer using techniques such as those described above. It is also preferred that dispersing groups be incorporated into the Preferred Vinyl Copolymer using one of the techniques described previously, and especially by one of two methods: (1) the use of a nonhalogenated vinyl monomer bearing a dispersing group, such as (meth)acryloyloxyethyl trimethyl ammonium chloride, during copolymerization of the Preferred Vinyl Copolymer, or (2) the reaction of OH groups on the Preferred Vinyl Copolymer with a difunctional compound comprising an NCO moiety and a quaternary ammonium moiety (as described in Assignee's copending application Ser. No. 08/329492, referred to above) in order to further provide the Preferred Vinyl Copolymer with quaternary ammonium functionality.

The term "nondispersing" with respect to the nondispersing vinyl monomer means that the monomer bears no dispersing group, no fluorine-containing group, no nitrile group, and no hydroxyl group. Representative examples of suitable nondispersing vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like.

Most preferably, the nondispersing vinyl monomer of the Preferred Vinyl Copolymer is selected from styrene; an alkyl ester of (meth)acrylic acid wherein the alkyl group of the alkyl ester has 1 to 4 carbon atoms; and a blend comprising styrene and an alkyl ester of (meth)acrylic acid wherein the weight ratio of styrene to the alkyl ester is in the range from 1:9 to 9:1. For Preferred Vinyl Copolymers containing such an alkyl ester, the alkyl ester is preferably methyl (meth)acrylate, more preferably methyl methacrylate.

The vinyl copolymers of the present invention may be prepared from vinyl monomers by free-radical polymerization methods known in the art, including but not limited to bulk, solution, emulsion and suspension polymerization methods. For example, according to the solution polymerization method, vinyl copolymers of the present invention are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

Solvents useful in such polymerizations can vary according to solubility of the monomers and additives. Typical solvents include ketones such as acetone, methyl ethyl ketone, 3-pentanone, methyl isobutyl ketone, diisobutyl ketone, and cyclohexanone; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, tetrahydropyran, and dioxane; and aprotic solvents such as dimethylformamide, dimethylsulfoxide and the like, and mixtures thereof. Alcohols such as methanol, ethanol, propanol, n-butanol, isopropanol, isobutanol, cyclohexanol and methyl cyclohexanol are not preferred in cases where isocyanates are used for curing of the magnetic layer. The preferred solvent for preparation of the vinyl copolymers of the present invention is methyl ethyl ketone (MEK) because it is also the preferred medium in which the magnetic dispersions, described below, are prepared due to the ready solubility therein of polyurethane-vinyl copolymer blends.

Chain transfer agents suitable for solution polymerization include but are not limited to alcohols, mercaptans, certain halogenated small molecules, and mixtures thereof Preferably, the chain transfer agent is chosen from the group consisting of carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for solution polymerization include those that are soluble in the reaction solvent and that are thermally activated, including but not limited to azo compounds, peroxides, and mixtures thereof Useful peroxide initiators include those chosen from the group consisting of benzoyl peroxide, lauroyl peroxide, di-t-butyl peroxide and the like, and mixtures thereof Useful azo compound initiators include those chosen from the group consisting of 2,2'-azobis(2-methylbutyronitrile); 2,2'-azobis(isobutyronitrile); and 2,2'-azobis(2,4-dimethylpentanenitrile); each of which is commercially available as VAZO 67, VAZO 64, and VAZO 52, respectively, from E. I. Du Pont de Nemours and Co. The preferred thermal polymerization initiator is the VAZO 64 brand initiator because of its ease of use and its half-life characteristics (e.g., at 64° C., half-life is 10 hours).

Vinyl copolymers of the present invention may also be prepared by emulsion polymerization methods. Typically, an emulsion comprising vinyl monomers, a chain-transfer agent and a water-soluble oxidation-reduction ("redox")-type initiator system is prepared in an inert atmosphere, then heated carefully until a reaction exotherm occurs. The reaction mixture is stirred and cooled and the resulting latex is collected. Optionally, an ionic or nonionic surfactant may be added to the reaction mixture. Redox free-radical initiators useful in the invention include but are not limited to those chosen from the group consisting of tertiary amines with organic peroxides (exemplified by the N, N-diethylaniline-benzoyl peroxide pair); organic halides with transition metal complexes (exemplified by the carbon tetrachloride-molybdenum hexacarbonyl pair); inorganic oxidation-reduction systems (exemplified by the potassium persulfate-sodium metabisulfite pair); and organic-inorganic systems (exemplified by the 2-mercaptoethanol-$Fe^{+3}$ pair). Inorganic redox initiators are preferred for the copolymers of the invention because of their ease of handling and useful reaction temperature range.

In preferred embodiments, the soft resin component is a polyurethane polymer. Representative examples of suitable polyurethane polymers include polyester polyurethanes, polyether polyurethanes, polyether polyester polyurethanes, polycarbonate polyurethanes, polyester polycarbonate polyurethanes, polycaprolactone polyurethanes, mixtures thereof, and the like. Surprisingly, the vinyl copolymers of the present invention are miscible with polyurethanes inasmuch as blends of these materials show a single $T_g$. This miscibility may be attributable to the presence of both the pendant nitrile and pendant hydroxyl groups on the vinyl copolymer. The two materials are also compatible as indicated by the observation that polymeric binders having polyurethanes as the soft resin component and vinyl copolymers of the present invention as the hard resin component provide magnetic layers with excellent mechanical and electromagnetic characteristics.

As an option, the soft resin component may contain one or more pendant functional groups to enhance the performance of the magnetic recording medium. For example, the soft resin component may contain carbon-carbon double bonds and/or hydroxyl groups to facilitate crosslinking of the secondary polymer component if desired. As other examples of pendant functional groups, the soft resin component may contain pendant dispersing groups in order to facilitate dispersion of the magnetic pigment in the polymeric binder. In one preferred embodiment, the soft resin component is a polyurethane polymer which bears pendant hydroxyl groups and at least one pendant dispersing group. In another preferred embodiment, the polyurethane polymer bears pendant hydroxyl groups, at least one pendant dispersing group, and at least one pendant radiation curable group.

In addition to the vinyl copolymer as the hard resin component, the soft resin component, and the magnetic pigment, the magnetic layers of the present invention may also comprise one or more conventional additives such as lubricants; abrasives; crosslinking agents; head cleaning agents; thermal stabilizers; antioxidants; dispersants; wetting agents; antistatic agents; fungicides; bactericides; surfactants; coating aids; nonmagnetic pigments; and the like in accordance with practices known in the art.

As one example of a process for preparing a magnetic recording medium, the components of the magnetic layer are combined and mixed with a suitable solvent to form a substantially homogeneous dispersion. The dispersion is then coated onto a nonmagnetizable substrate, which may be primed or unprimed. The dispersion may be applied to the substrate using any conventional coating technique, such as gravure or knife coating techniques. The coated substrate may then be passed through a magnetic field to orient or randomize the magnetic pigment after which the coating is dried, calendered if desired, and then allowed to cure.

Curing can be accomplished in a variety of ways. As one approach, an isocyanate crosslinking agent can be added to the dispersion just before the dispersion is coated onto the substrate. The NCO groups of the isocyanate crosslinking agent will then react with the hydroxyl groups of the polymeric binder, particularly when the dispersion has been coated and dried, i.e., in the absence of solvent. Preferably, a catalyst such as dibutyltin dilaurate may also be added in suitable catalytic amounts in order to facilitate this crosslinking reaction. Generally, using from 0.02 to 0.2 parts by weight of catalyst per 100 parts by weight of magnetic pigment has been found to be suitable in the practice of the present invention.

The isocyanate crosslinking agent, if any, is a polyfunctional isocyanate having an average functionality of at least 2 isocyanate groups per molecule. Examples of specific polyfunctional isocyanates useful as the isocyanate crosslinking agent in the practice of the present invention include materials commercially available as MONDUR CB-601, CB-75, CB-701, MONDUR-MRS from Miles, Inc.; DESMODUR L from Bayer A.G.; CORONATE L from Nippon Polyurethane Ind., Ltd.; and PAPI from Union Carbide Corp.

The isocyanate crosslinking agent is preferably used in an amount such that the molar ratio of NCO groups from the isocyanate crosslinking agent to the total number of hydroxyl groups from the hydroxyl functional polymer is greater than 0. Preferably, the molar ratio of the NCO groups from the isocyanate crosslinking agent to the total number of hydroxyl groups from the hydroxyl functional polymer is in the range from 0.3 to 5, more preferably 0.5 to 1.5.

As another approach to curing, one or more components of the polymeric binder may contain radiation curable moieties. The dried coating may then be irradiated to achieve curing of the radiation curable materials. Irradiation may be accomplished using any type of ionizing radiation, e.g., electron beam radiation or ultraviolet radiation, in accordance with practices known in the art. Preferably, radiation curing is accomplished with an amount of electron beam (E-beam) radiation in the range from 1 to 20 Mrads, preferably 4 to 12 Mrads, and more preferably 5 to 9 Mrads of electron beam radiation having an energy in the range from 100 to 400 keV, preferably 200 to 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising nitrogen or a noble gas and having an oxygen content of less than 500 parts per million ("ppm"). A preferred inert atmosphere is a nitrogen atmosphere having an oxygen content of less than 75 parts per million.

The use of radiation curing techniques may offer some advantages over isocyanate curing techniques. Whereas isocyanate curing of magnetic media is chemically unselective and highly dependent on such variables as temperature and humidity, radiation curing techniques are less sensitive to temperature and humidity.

The present invention will now be further described with reference to the following examples.

EXAMPLE 1

Four samples of copolymers were prepared from the following ingredients:

|  | parts by weight of solids | | | |
|---|---|---|---|---|
| Ingredient | 1A | 1B | 1C | 1D |
| Styrene ("ST") | 55 | 55 | 55 | 55 |
| 2-hydroxy ethyl methacrylate ("HEMA") | 26 | 26 | 26 | 26 |
| Acrylonitrile ("AN") | 19 | 19 | 19 | 19 |
| N-ethyl perfluorosulfonamido ethyl methacrylate ("EtF") (see U.S. Pat. No. 2,803,615, Example 3) | 0 | 2.5 | 5 | 10 |
| VAZO ™ 64 thermal initiator (E. I. Dupont de Nemours and Co.) (2,2'-azobisisobutyronitrile) | 0.3 | 0.32 | 0.32 | 0.32 |

For each sample, the ingredients were charged to a 32 ounce amber reaction bottle, along with sufficient MEK to produce an admixture determined to be at 40% solids. The admixture was purged with $N_2$ gas for 5 minutes at the rate of 1 liter per minute after which the bottle was sealed and tumbled in a constant temperature bath at 65° C. for 60 hours. The reaction product in each case was a viscous, clear solution containing a copolymer of the above-listed monomers ST, HEMA, AN and EtF. The value of % solids indicated a nearly quantitative conversion of monomers to copolymer. In addition, a monomer odor was not noticeable in the reaction product, indicating a substantially complete copolymerization reaction. The concentration of the fluorinated starting monomer EtF, which ranged from 0 to 10 weight % in Samples 1A–1D, is believed to correlate to the number of fluorinated chain segments present in the resulting copolymer.

EXAMPLE 2

Four samples of copolymers of the present invention in solution were prepared by the further reaction of the copolymer solutions identified as Samples 1A, 1B, 1C and 1D prepared in Example 1 with 1-(1-isocyanato-1-methylethyl)-3-(1-methylethenyl)-benzene ("TMI") in order to provide pendant unsaturated α-methyl styrenyl groups useful for radiation curing. TMI has the formula

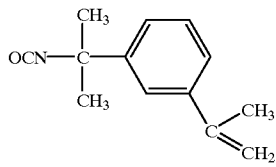

The NCO group of the TMI molecule reacts with hydroxyl groups on the copolymer according to the following generalized reaction scheme:

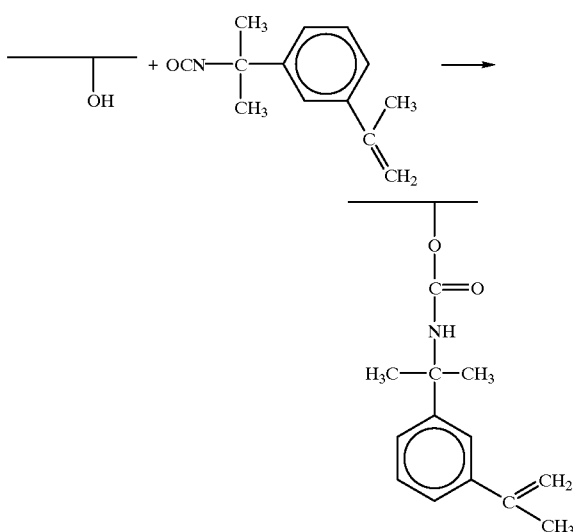

The samples were prepared according to the following formulations.

|  | parts by weight of solids | | | |
|---|---|---|---|---|
| Ingredient | 2A | 2B | 2C | 2D |
| Sample 1A copolymer (37.5% in MEK) | 36.5 | — | — | — |
| Sample 1B copolymer (39% in MEK) | — | 36.5 | — | — |
| Sample 1C copolymer (38.5% in MEK) | — | — | 36.5 | — |
| Sample 1D copolymer (38% in MEK) | — | — | — | 36.5 |
| 1-(1-isocyanato-1-methylethyl)-3-(1-methylethenyl)-benzene ("TMI") | 6.3 | 6.6 | 7.0 | 7.1 |
| Dibutyltindilaurate catalyst | 0.08 | 0.08 | 0.08 | 0.08 |

For each sample, the ingredients were placed in a jar along with sufficient MEK solvent to result in an admixture at about 38% solids. The jar was sealed and allowed to stand undisturbed at room temperature for 48 hours. The reaction was judged to be complete by observing with infrared spectroscopy the disappearance of the NCO peak at 2270 $cm^{-1}$.

EXAMPLE 3

Coatings of each copolymer solution prepared in the previous example were made by hand on a 76.2 mm (3 mil) polyethylene terephthalate film substrate. A knife coater was used to give approximately a 4 mm dry coating thickness. The coated substrates were then dried, first at room temperature for 3 hours, then at 100° C. for 2 hours. The four coated substrates were tested for surface tension using a set of Dyne Pens from UV Process Supply, Inc. In this test, pens with ink having progressively lower dyne numbers, or surface tension, are marked on the coating. The minimum dyne number (given in dynes/cm) of the pen at which ink wettability was retained for 2 minutes after marking correlates to the surface tension of that coating. Each substrate was tested three times and the results were averaged. As used herein, "wettability" of a liquid is defined as the ability to form and retain a substantially continuous layer of the liquid on a surface. Poor wettability may be characterized by the formation of beads rather than a continuous layer of liquid.

Contact angles were also measured on the four coatings using a Kern Co. Contact Angle Goniometer with NUJOL™ mineral oil (Aldrich Chemical Co, Inc.) and also with deionized (DI) water as the contact liquids.

The contact angle of a substantially flat surface is measured as follows: The surface to be tested is fixed in a horizontal position. A syringe containing a contact liquid having a known surface tension is positioned above the surface. A drop of contact liquid of known volume is released from the syringe onto the surface and the shape of the drop is observed through a magnified viewer. After a fixed period of time, the angle the edge of the drop makes with the perpendicular to the surface is measured by a scale in the viewer. For instance, a drop which completely flattens on the surface (indicating very low surface tension and high wettability) would have a contact angle of 90°. Results are shown in the table below, along with EtF starting monomer concentration.

| Sample | EtF monomer concentration [weight % of solids] | Dyne number [dynes/cm] | Contact angle [degrees] NUJOL oil | Contact angle [degrees] DI water |
|---|---|---|---|---|
| 2A | 0 | 43 | 9.4 | 66.4 |
| 2B | 2 | 37 | 21.6 | 71.4 |
| 2C | 4.4 | 35 | 25.8 | 71.0 |
| 2D | 7.6 | 33 | 32.9 | 56.5 |

The dyne number of the coating, indicating surface tension, is reduced with addition of EtF monomer to the copolymer. Since surface tension is an indicator of surface energy, which in turn is related to coefficient of friction, this surface tension reduction effect can be taken as an indication that the addition of EtF monomer to the copolymer aids in lubrication of a magnetic recording medium by reducing coefficient of friction. While the DI water contact angle showed no apparent trend, the NUJOL™ oil contact angle increased steadily with EtF monomer concentration, also indicating reduced surface tension.

EXAMPLE 4

Four magnetic dispersions were prepared using the four copolymer solutions prepared in Example 2. The dispersions were prepared according to the following formulations.

| charge | Magnetic Dispersion Ingredient | parts by weight of solids 4A | 4B | 4C | 4D |
|---|---|---|---|---|---|
| A | SMO III ™ Co-doped γ-$Fe_2O_3$ Magnetic Pigment | 100 | 100 | 100 | 100 |
|  | Ketjenblack ® Conductive Carbon Black (Akzo Chemie) about 10 nm | 7 | 7 | 7 | 7 |
|  | HP-F Alumnina (Reynolds Metal Co.) | 10 | 10 | 10 | 10 |
|  | Sample 2A Copolymer (40% solids in MEK) | 12 | — | — | — |
|  | Sample 2B Copolymer (40% solids in MEK) | — | 12 | — | — |
|  | Sample 2C Copolymer (40% solids in MEK) | — | — | 12 | — |
|  | Sample 2D Copolymer (40% solids in MEK) | — | — | — | 12 |
|  | Hydroxy-functional Polyurethane (40% solids in MEK) | 12 | 12 | 12 | 12 |
| B | Isocetyl Stearate | 4.5 | 4.5 | 4.5 | 4.5 |
|  | Oleic Acid | 1.5 | 1.5 | 1.5 | 1.5 |
|  | Ebecryl-220 Aromatic urethane hexacrylate oligomer used as crosslinker (Radcure Specialties, Inc.) (40% solids in MEK) | 9 | 9 | 9 | 9 |

To prepare each magnetic dispersion, Charge A was mixed together with sufficient MEK solvent to give an admixture at approximately 40% solids. The admixture was then milled in an AIMEX Labo Sand Grinder for 10 hours, resulting in a smooth dispersion. Charge B was then added to the dispersion, and the dispersion was thinned down to approximately 31% solids using MEK solvent. The dispersion was then filtered through a 15 micron disc filter. The bulk dispersions were tested for low shear viscosity, electromagnetic properties, and dispersion quality. Viscosity was measured with a cone-and-plate viscometer (Brookfield Engineering Laboratories, Inc., Stoughton, Mass.). Electromagnetic properties were measured with an MH Meter. Dispersion quality was measured by preparing a smear of dispersion on a microscope slide and visually inspecting the slide through an optical microscope at 200 times magnification. All of the dispersions appeared to be virtually indistinguishable with respect to these properties, indicating that the presence of fluorinated chain segments in the copolymers of this invention has no apparent deleterious effects on the magnetic dispersion.

Each dispersion was then applied to a 76.2 mm (3 mil), biaxially oriented polyethylene terephthalate (PET) film substrate and dried at 250° F. for 5 minutes. The coatings were then cured with a 10 Mrad dose of a 225 KeV electron beam curing apparatus from Energy Sciences, Inc. The coatings were then tested for cure level by extracting the coating with DMSO solvent and analyzing the extracted material using ultraviolet (UV) spectroscopy for absorbance at 280 nm wavelength. All coatings were acceptably cured.

EXAMPLE 5

Five copolymer samples were prepared from the following ingredients.

| Ingredient | parts by weight of solids | | | | |
|---|---|---|---|---|---|
| | 5A | 5B | 5C | 5D | 5E |
| Styrene ("ST") | 44 | 36 | 28 | 20 | 12 |
| 2-hydroxy ethyl methacrylate ("HEMA") | 26 | 26 | 26 | 26 | 26 |
| Acrylonitrile ("AN") | 30 | 30 | 30 | 30 | 30 |
| N-ethyl perfluorosulfonamido ethyl methacrylate ("EtF") (see U.S. Pat. No. 2,803,615, Example 3) | 0 | 8 | 16 | 24 | 32 |
| VAZO ™ 64 thermal initiator E. I. Dupont de Nemours and Co.) (2,2'-azobisisobutyronitrile) | 0.5 | 0.5 | 0.5 | 0.5 | 0.5 |
| 3-mercapto 1,2-propane diol ("MPD") | 0.3 | 0.3 | 0.3 | 0.3 | 0.3 |

The samples were prepared in the same manner as Example 1, with sufficient MEK solvent to provide a copolymer solution at about 40% solids.

The solution of copolymer Sample 5E was used to prepare a dispersion containing 20 parts by weight (pbw) of copolymer and 80 pbw of Co—$\gamma$—$Fe_2O_3$ magnetic pigment at approximately 40% solids in MEK. The dispersion was milled in an AIMEX Labo Sand Grinder until smooth. The dispersion entrained large amount of air during milling and foamed so excessively, even at low shaft speeds, that milling was terminated. Therefore it appears that above a certain concentration of fluorinated starting monomer, undesirable foaming may occur during dispersion processing.

EXAMPLE 6

A solution containing a copolymer of the present invention having pendant quaternary ammonium functionalities was prepared in the following manner.

An amine isocyanate intermediate, hereinafter referred to as Compound I, was first prepared as follows. Isophorone diisocyanate (IPDI, 192.0 g) and dimethylethanolamine (DME, 85.5 g) were added to MEK (methyl ethyl ketone 160.0 g) while stirring. The reaction flask was equipped with a water-cooled reflux condenser. In about 15 minutes the temperature rose to 60° C. and stayed at 6014 70° C. for an hour. The reaction was allowed to go to completion for 16 hours, thereby minimizing the IPDI residual level which may cause gelation from crosslinking and chain extension in the subsequent quaternization step. The final solution of Compound I was slightly yellow and had a low viscosity.

Compound I was then converted to an isocyanate having ammonium methyl sulfate groups, hereinafter referred to as Compound II. To accomplish the conversion, a solution of dimethyl sulfate, $(CH_3)_2SO_4$ (114 g), in MEK (54 g) was added to the entire solution of Compound I slowly with stirring. The rate of addition was varied to keep the temperature at 45–55° C. for 40 min. The reaction mixture was then allowed to stand for 16 hours to yield a slightly orange colored low viscosity solution of Compound II in MEK (65% solids). The orange color most likely came from dark brown oily contaminants in dimethylsulfate. The molar ratio of Compound I:$(CH_3)_2SO_4$ in this example was calculated for complete conversion of the amine to the quaternary ammonium group.

An initial copolymer solution was then prepared in the following manner: 90 g of styrene ("ST"), 75 g of acrylonitrile ("AN"), 65 g of 2-hydroxy ethyl methacrylate ("HEMA"), 20 g of N-ethyl perfluorosulfonamido ethyl methacrylate ("EtF"), 1.25 g of 2,2'-azobisisobutyronitrile VAZO™ thermal initiator (E.I. Dupont de Nemours and Co.), 0.75 g of 3-mercapto 1,2-propane diol ("MPD") and 375 g of MEK were charged into a 32 ounce amber reaction bottle. The resulting admixture was purged with $N_2$ gas at a rate of 1 l/min. for 5 minutes after which the bottle was sealed and tumbled in a constant temperature bath at 65° C. for 60 hours. The resulting copolymer solution was a clear viscous material with essentially no monomer smell, indicating a complete copolymerization reaction. Several batches of copolymer solution were prepared for subsequent use.

The initial copolymer solution was then involved in a further reaction to form a final copolymer solution. 2400 g of the initial copolymer solution (30% solids in MEK) was charged to a 1 gallon glass jar along with 297 g of 1-(1-isocyanato-1-methylethyl)-3-(1-methylethenyl)-benzene ("TMI"), 43 g of Compound II ("IDM") solution as prepared above (65% solids in MEK), 2 g of dibutyltindilaurate catalyst, 0.2 g of butylated hydroxy toluene ("BHT") stabilizer, and 425 g of MEK. The contents of the jar were shaken thoroughly and allowed to stand undisturbed for 48 hours at room temperature. After 48 hours, the reaction product was a clear, slightly yellow, viscous solution of the final copolymer. When analyzed by infrared spectroscopy, the solution showed no absorption peak at 2270 $cm^{-1}$, indicating a complete reaction of the isocyanate groups on the TMI and IDM molecules.

A magnetic dispersion was then prepared according to the following formulation.

| Magnetic Dispersion Ingredient | parts by weight solids |
|---|---|
| Charge A | |
| SMO III ™ Co-doped γ-Iron oxide magnetic pigment | 100 |
| Ketjenblack conductive carbon black (Akzo Chemie), about 10 nm | 7 |
| Final copolymer of this example (40% solids in MEK) | 10.6 |
| Hydroxy-functional polyester polyurethane (30% solids in MEK) | 8.05 |
| Charge B | |
| HP-F Alumina (Reynolds Metal, Inc.) | 10 |
| Isocetyl stearate | 4.5 |
| Myristic Acid | 1.5 |
| SR-399 Radiation Crosslinker (Sartomer Co., Inc.) (100% solids) | 9 |

Charge A was then mixed together with sufficient solvent (An 80:20 blend of MEK and cyclohexanone) to give an admixture at approximately 44% solids. The admixture was then milled in a horizontal sand mill for 12 passes, resulting in a smooth dispersion. The alumina was predispersed and premilled using phosphorylated polyoxyalkyl polyol (75% solids in toluene) (see U.S. Pat. No. 5,028,483 col. 5, lines 32–45) and EMCOL phosphate (Witco Corp.) as dispersing agents with MEK as the solvent. The dispersing agents were added at 1% (by weight) each based on weight of alumina. The resulting dispersion was approximately 75% solids. Charge B was then added to the dispersion, and the dispersion was thinned down to approximately 30% solvents using a 80:20 MEK:cyclohexanone solvent mixture. The dispersion was filtered.

The dispersion was coated onto a 76.2 mm (3 mil), biaxially oriented polyethylene terephthalate (PET) film substrate using a rotogravure coating method, dried at 240° F. (116° C.), and cured with a 225 KeV electron beam (E-beam) curing apparatus from Energy Sciences, Inc. using a 10 Mrad dosage level. The coated web was then converted into 3.5" diameter diskettes which were evaluated for electromagnetic performance, error quality, durability and running torque. Electromagnetic performance and error quality were measured according to ANSI X3.171. Durability was measured in two ways. First an accelerated test was run using a modified single-sided head drive at a speed and a head loading force which were higher than standard conditions. A long term test was then run using a standard two-sided drive under normal operating conditions. Media wear in both tests was graded visually. Running torque was measured according to ANSI X3.171 using a CTC 5300 Torque Tester (Cyber Technics Corp.) with heads loaded. The results are shown as the average of three tests in the following table.

| Test | Diskette with Copolymer of this Invention |
| --- | --- |
| Electromagnetic Performance | |
| 2F Amplitude [% gold] | 93.9 |
| Resolution [% gold] | 95.6 |
| Modulation [% gold] | 5.3 |
| Error Quality | |
| Extra Pulse Threshold | 14 |
| Missing Pulse Threshold | 70 |
| Durability | |
| 4 hour Accelerated Test, 8 diskettes tested [% passing] | 100 |
| Long Term Test [no. passes] | >3 million |
| Running Torque [g-cm] | 35 |

Other embodiments of this invention will be apparent to those skilled in the art upon consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A magnetic recording medium, comprising a magnetic layer provided on a nonmagnetizable substrate,
   wherein the magnetic layer comprises a magnetic pigment dispersed in a polymeric binder, the polymeric binder comprising a resin; and
   wherein the resin comprises a nonchlorinated fluorine-containing vinyl copolymer having pendant nitrile groups, pendant hydroxyl groups, and pendant fluorine-containing groups.

2. The magnetic recording medium according to claim 1, wherein the resin is a hard resin component of the polymeric binder, the hard resin component having a $T_g$ of greater than 50° C., and the polymeric binder further comprises a soft resin component having a $T_g$ of less than 50° C.

3. The magnetic recording medium according to claim 2, wherein the soft resin component is a polyurethane polymer.

4. The magnetic recording medium according to claim 2, wherein the hard resin component further comprises at least one pendant dispersing group.

5. The magnetic recording medium according to claim 4, wherein the dispersing group is a quaternary ammonium moiety.

6. The magnetic recording medium according to claim 2, wherein the hard resin component further comprises a plurality of pendant radiation curable moieties.

7. The magnetic recording medium according to claim 4, wherein the hard resin component further comprises a plurality of pendant radiation curable moieties.

8. The magnetic recording medium according to claim 5, wherein the hard resin component further comprises a plurality of pendant radiation curable moieties.

9. The magnetic recording medium according to claim 1, wherein the nonchlorinated fluorine-containing vinyl copolymer is a copolymer of monomers comprising (meth)acrylonitrile, one or more hydroxyl functional vinyl monomers, one or more vinyl monomers bearing a fluorine-containing group, and one or more nondispersing vinyl monomers.

10. The magnetic recording medium according to claim 1, wherein the nonchlorinated fluorine-containing vinyl copolymer is a copolymer of monomers comprising
    (a) 15 to 40 parts by weight (meth)acrylonitrile;
    (b) 1 to 15 parts by weight of one or more hydroxyl functional vinyl monomers;
    (c) 2.5 to 20 parts by weight of one or more vinyl monomers bearing a fluorine-containing group; and
    (d) 40 to 75 parts by weight of one or more nondispersing vinyl monomers.

11. The magnetic recording medium according to claim 10, wherein the hydroxyl functional vinyl monomer is selected from 2-hydroxyethyl (meth)acrylate, α-hydroxy propyl (meth)acrylate, and mixtures thereof.

12. The magnetic recording medium according to claim 10, wherein the vinyl monomer bearing a fluorine-containing group has the formula

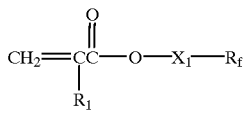

wherein $R_1$ is H or $CH_3$; $X_1$ is a single bond or an organic divalent linking group; and $R_f$ is a fluorine-containing moiety.

13. The magnetic recording medium according to claim 12, wherein the vinyl monomer bearing a fluorine-containing group is a (meth)acrylate ester of a fluorine-containing alcohol.

14. The magnetic recording medium according to claim 13, wherein the fluorine-containing alcohol is selected from the group consisting of a 1, 1-dihydro fluoroalkanol, a fluoroalkylsulfonamido alcohol, a perfluorocyclodihydroalkyl alcohol, a fluoroether alcohol, and mixtures thereof.

15. The magnetic recording medium according to claim 10, wherein the vinyl monomer bearing a fluorine-containing group has the formula

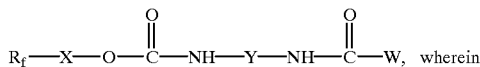

$R_f$ is a perfluoroalkyl group comprising from about 4 to about 20 carbon atoms;

X is a divalent organic linking group;

Y is a divalent organic linking group; and

W is a monovalent organic group containing an ethylenically unsaturated group.

16. The magnetic recording medium according to claim 15, wherein W has the formula

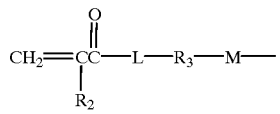

wherein $R_2$ is selected from the group consisting of H, methyl, ethyl, cyano, and carboxymethyl; L is selected from the group consisting of —O— and —NH—; $R_3$ is an alkylene group comprising 1 to 12 carbon atoms; and M is selected from the group consisting of —O—, —NH—, and

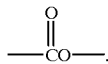

17. The magnetic recording medium according to claim 10, wherein the vinyl monomer bearing a fluorine-containing group is selected from the group consisting of

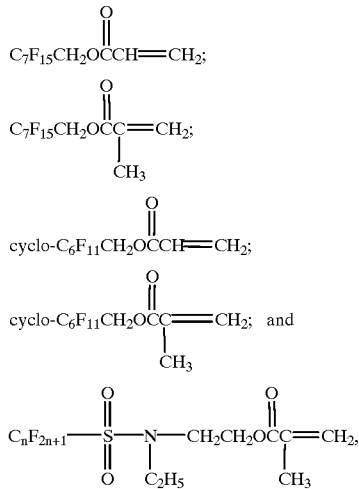

wherein n has an average value in the range from about 7 to about 8.

18. The magnetic recording medium according to claim 10, wherein the nondispersing vinyl monomer is styrene.

19. The magnetic recording medium according to claim 10, wherein the nondispersing vinyl monomer is an alkyl ester of a (meth)acrylic acid, wherein the alkyl group of the ester has 1 to 20 carbon atoms.

20. The magnetic recording medium according to claim 10, wherein the nondispersing vinyl monomer is an alkyl ester of a (meth)acrylic acid, wherein the alkyl group of the ester has 1 to 8 carbon atoms.

21. The magnetic recording medium according to claim 10, wherein the nondispersing vinyl monomer is an alkyl ester of a (meth)acrylic acid, wherein the alkyl group of the ester has 1 to 4 carbon atoms.

22. The magnetic recording medium according to claim 19, wherein the alkyl ester of a (meth)acrylic acid is methyl (meth)acrylate.

23. The magnetic recording medium according to claim 10, wherein the nondispersing vinyl monomer is a blend comprising styrene and an alkyl ester of a (meth)acrylic acid, wherein the weight ratio of the styrene to the alkyl ester of a (meth)acrylic acid is in the range from 1:9 to 9:1.

24. A magnetic recording medium, comprising a magnetic layer provided on a nonmagnetizable substrate, wherein the magnetic layer comprises a magnetic pigment dispersed in a polymeric binder, the polymeric binder comprising a resin; and wherein the resin is a nonchlorinated fluorine-containing vinyl copolymer having pendant groups consisting essentially of nitrile groups, pendant hydroxyl groups, and pendant fluorine-containing groups.

25. A magnetic recording medium, comprising a magnetic layer provided on a nonmagnetizable substrate, wherein the magnetic layer comprises a magnetic pigment dispersed in a polymeric binder, the polymeric binder comprising a resin; and wherein the resin is a nonchlorinated fluorine-containing vinyl copolymer having pendant groups consisting essentially of nitrile groups, pendant hydroxyl groups, pendant fluorine-containing groups, and pendant dispersing groups.

26. A magnetic recording medium, comprising a magnetic layer provided on a nonmagnetizable substrate, wherein the magnetic layer comprises a magnetic pigment dispersed in a polymeric binder, the polymeric binder comprising a resin; and wherein the resin is a nonchlorinated fluorine-containing vinyl copolymer having pendant groups consisting essentially of nitrile groups, pendant hydroxyl groups, pendant fluorine-containing groups, and pendant radiation curable moieties.

27. A magnetic recording medium, comprising a magnetic layer provided on a nonmagnetizable substrate, wherein the magnetic layer comprises a magnetic pigment dispersed in a polymeric binder, the polymeric binder comprising a resin; and wherein the resin is a nonchlorinated fluorine-containing vinyl copolymer having pendant groups consisting essentially of nitrile groups, pendant hydroxyl groups, pendant fluorine-containing groups, pendant radiation curable moieties, and pendant dispersing groups.

* * * * *